(12) United States Patent
Blumel et al.

(10) Patent No.: US 9,283,908 B2
(45) Date of Patent: Mar. 15, 2016

(54) BUMPER ASSEMBLY

(71) Applicants: Michael Blumel, Flatz (AT); Christian Hengst, Vienna (AT); Ernst Lindtner, Baden (AT)

(72) Inventors: Michael Blumel, Flatz (AT); Christian Hengst, Vienna (AT); Ernst Lindtner, Baden (AT)

(73) Assignee: Cosma Engineering Europe AG, Oberwaltersdorf (AT)

(\*) Notice: Subject to any disclaimer, the term of this patent is extended or adjusted under 35 U.S.C. 154(b) by 0 days.

(21) Appl. No.: 14/304,952

(22) Filed: Jun. 15, 2014

(65) Prior Publication Data

US 2014/0292008 A1 Oct. 2, 2014

Related U.S. Application Data

(63) Continuation of application No. 13/810,784, filed as application No. PCT/EP2011/003893 on Aug. 3, 2011, now Pat. No. 8,770,639.

(60) Provisional application No. 61/370,142, filed on Aug. 3, 2010.

(51) Int. Cl.
| | |
|---|---|
| *B60R 19/34* | (2006.01) |
| *B21D 53/88* | (2006.01) |
| *B60R 19/03* | (2006.01) |
| *B60R 19/26* | (2006.01) |
| *B60R 19/18* | (2006.01) |
| *B21D 22/02* | (2006.01) |
| *C21D 8/02* | (2006.01) |
| *B21D 37/16* | (2006.01) |

(Continued)

(52) U.S. Cl.
CPC ............... *B60R 19/34* (2013.01); *B21D 53/88* (2013.01); *B60R 19/03* (2013.01); *B60R 19/18* (2013.01); *B21D 22/02* (2013.01); *B21D 22/022* (2013.01); *B21D 37/16* (2013.01); *B60R 19/26* (2013.01); *B60R 2019/182* (2013.01); *B60R 2019/1813* (2013.01); *B60R 2019/1826* (2013.01); *C21D 1/673* (2013.01); *C21D 8/0221* (2013.01); *C21D 8/0294* (2013.01); *C21D 9/46* (2013.01); *Y10T 29/49622* (2015.01); *Y10T 29/49826* (2015.01)

(58) Field of Classification Search
CPC ........ B60R 19/04; B60R 19/34; B60R 19/18; B60R 19/26; B60R 19/03; B21D 53/88; Y10T 29/49622; Y10T 29/49893; Y10T 29/49906; Y10T 29/49956
See application file for complete search history.

(56) References Cited

U.S. PATENT DOCUMENTS 3,972,744 A * 8/1976 Cantrell .................... 148/572
3,983,962 A * 10/1976 Torke ........................ 188/377

(Continued)

FOREIGN PATENT DOCUMENTS

EP 0734908 A2 10/1996
EP 2025560 A1 2/2009

*Primary Examiner* — Jason L Vaughan
(74) *Attorney, Agent, or Firm* — Dickinson Wright PLLC

(57) ABSTRACT

A method of making a beam-box crash management system comprises forming a first shell (100a) from a first sheet metal blank by a hot forming process. The first shell has a high tensile strength beam portion (102a) and integrally formed there-with a first low yield strength crash box portion (104a) proximate a first end of the beam portion and second low yield strength crash box portion proximate a second end of the beam portion. The first shell also has an open face extending continuously along the beam portion and each of the first and second crash box portions (104a, 106a). A closing element (100b) is formed from a second sheet metal blank, and is fixedly secured adjacent to the open face of the first shell.

5 Claims, 4 Drawing Sheets

(51) Int. Cl.
 *C21D 1/673* (2006.01)
 *C21D 9/46* (2006.01)

(56) References Cited

U.S. PATENT DOCUMENTS

| | | | | |
|---|---|---|---|---|
| 5,722,708 | A * | 3/1998 | Jonsson | 293/102 |
| 5,785,367 | A * | 7/1998 | Baumann et al. | 293/133 |
| 5,972,134 | A * | 10/1999 | Buschsieweke et al. | 148/567 |
| 6,986,536 | B1 * | 1/2006 | Heatherington et al. | 293/102 |
| 7,070,228 | B2 * | 7/2006 | Shimizu et al. | 296/187.01 |
| 7,077,920 | B2 * | 7/2006 | Gehringhoff | 148/530 |
| 7,461,874 | B2 * | 12/2008 | Guiles et al. | 293/102 |
| 7,703,820 | B2 * | 4/2010 | Perarnau Ramos et al. | 293/155 |
| 8,123,263 | B2 * | 2/2012 | Evans | 293/132 |
| 8,276,954 | B2 * | 10/2012 | Handing et al. | 293/133 |
| 8,770,639 | B2 * | 7/2014 | Blumel et al. | 293/133 |
| 8,967,687 | B2 * | 3/2015 | Kosaka et al. | 293/155 |
| 2009/0045638 | A1 * | 2/2009 | Handing et al. | 293/155 |
| 2014/0070552 | A1 * | 3/2014 | Shimotsu | 293/102 |

\* cited by examiner

BUMPER ASSEMBLY

CROSS-REFERENCE TO RELATED APPLICATIONS

This U.S. Continuation patent application claims the benefit of U.S. patent application Ser. No. 13/810,784 filed Jan. 17, 2013 entitled "Bumper Assembly," which claims the benefit of International Application Serial No. PCT/EP2011/003893 filed Aug. 3, 2011 and U.S. Provisional Patent Application Ser. No. 61/370,142 filed Aug. 3, 2010. the entire disclosures of the applications being considered part of the disclosure of this application, and hereby incorporated by reference.

FIELD OF THE INVENTION

The instant invention relates generally to bumper assemblies for use in vehicles, and more particularly to a bumper crash management system including a component that is formed by the tailored tempering process.

BACKGROUND OF THE INVENTION

Automobiles are equipped with bumpers, which are attached to either end thereof to absorb impact in a collision and limit as much as possible any damage to parts of the vehicle. In order to minimize damage to vehicles during low speed impacts, such as for instance less than about 15-16 km/h, car manufacturers provide "sacrificial elements" known as crash boxes, which in the event of impact cushions most of the impact energy, being deformed but preventing deformation of the vehicle chassis. In fact, any deformation of the vehicle chassis results in high repair costs, leading to unacceptably high insurance premiums, etc.

Typically, a bumper assembly with a sacrificial element comprises a pair of crash boxes, a cross member, a cushioning element such as foam or the like, and a bumper shield. In a prior art bumper assembly, the two crash boxes are fixed to the ends of two respective longitudinal members of the vehicle chassis via two respective plates. The cross member is joined to the opposite side of the crash boxes and extends continuously from one crash box to the other. The cushioning element made of foam or the like, typically, is constrained to the outside of the cross member. A bumper shield, having primarily aesthetic and aerodynamic functions, covers the bumper assembly.

Conventionally, both the crash boxes and the cross member are made of metallic materials, such as for instance steel or aluminum. The prior art solution, with metal crash boxes, cross members and plates for fixing the crash boxes to the vehicle, are considered to be somewhat awkward to assemble, heavy, costly and not easily adaptable to new vehicle models.

Accordingly, it would be advantageous to provide a crash management system that overcomes at least some of the above-mentioned limitations.

SUMMARY OF EMBODIMENTS OF THE INVENTION

In accordance with an aspect of the invention there is provided a method of making a beam-box crash management system, comprising: forming a first shell from a first sheet metal blank by a hot forming process, the first shell having a high tensile strength beam portion and integrally formed therewith a first low yield strength crash box portion proximate a first end of the beam portion and a second low yield strength crash box portion proximate a second end of the beam portion, the first shell having an open face extending continuously along the beam portion and each of the first and second crash box portions; forming a closing element from a second sheet metal blank; and, fixedly securing the closing element adjacent to the open face of the first shell.

In accordance with an aspect of the invention there is provided a method of making a beam-box crash management system, comprising: heating a first sheet metal blank to at least an austenitizing temperature of the metal; hot forming the austenitic blank in a pair of cooled tools to form a first one piece beam-box component having a generally three-sided channel structure with one open side; during the hot forming process, cooling a beam portion of the formed component at a first rate that is sufficiently rapid to harden the beam portion into an essentially martensitic structure with a tensile strength of between about 1300 N/mm$^2$ and about 1600 N/mm$^2$, and cooling crash box portions of the formed component at a second rate that is slower than the first rate, such that the crash box portions achieve a yield strength of between approximately 200 N/mm$^2$ and 450 N/mm$^2$; forming a closing element from a second sheet metal blank; and, fixedly securing the closing element along the open side of the first one piece beam-box component.

In accordance with an aspect of the invention there is provided a method of making a beam-box crash management system, comprising: heating a first sheet metal blank to at least an austenitizing temperature of the metal; hot forming the austenitic blank in a pair of cooled tools to form a first one piece beam-box component having a generally three-sided channel structure with one open side; during the hot forming process, cooling a beam portion of the formed component at a first rate that is sufficiently rapid to harden the beam portion into an essentially martensitic structure with a tensile strength of between about 1300 N/mm2 and about 1600 N/mm2, and cooling crash box portions of the formed component at a second rate that is slower than the first rate, such that the crash box portions achieve a yield strength of between approximately 200 N/mm2 and 450 N/mm2; forming a closing element from a second sheet metal blank; and, fixedly securing the closing element along the open side of the first one piece beam-box component.

In accordance with an aspect of the invention there is provided a beam-box crash management system, comprising: a first one piece shell having a high tensile strength beam portion and integrally formed therewith a first low yield strength crash box portion proximate a first end of the beam portion and a second low yield strength crash box portion proximate a second end of the beam portion, the first one piece shell having an open face extending continuously along the beam portion and each of the first and second crash box portions; and, a closing element fixedly secured adjacent to the open face of the first one piece shell.

In accordance with an aspect of the invention there is provided a beam-box crash management system, comprising: a first beam-box shell, fabricated from a first sheet metal blank, having a high tensile strength beam portion and integrally formed therewith a first low yield strength crash box portion proximate a first end of the beam portion and a second low yield crash box portion proximate a second end of the beam portion, the first end being opposite the second end, and the first beam-box shell having one open side defining a first rim; a second beam-box shell, fabricated from a second sheet metal blank, having a high tensile strength beam portion and integrally formed therewith a first low yield strength crash box structure proximate a first end of the beam portion and a second low strength crash box structure proximate the second end of the beam portion, the first end being opposite the second end, and the second beam-box shell having one open side defining a second rim; wherein the first beam-box shell is fixedly secured to the second beam-box shell such that the first rim abuts the second rim, and such that the beam portion of the first beam-box shell is aligned with the beam portion of the second beam-box shell and the first and second crash box structures of the first beam-box shell are aligned with a respective one of the first and second crash box structures of the second beam-box shell.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
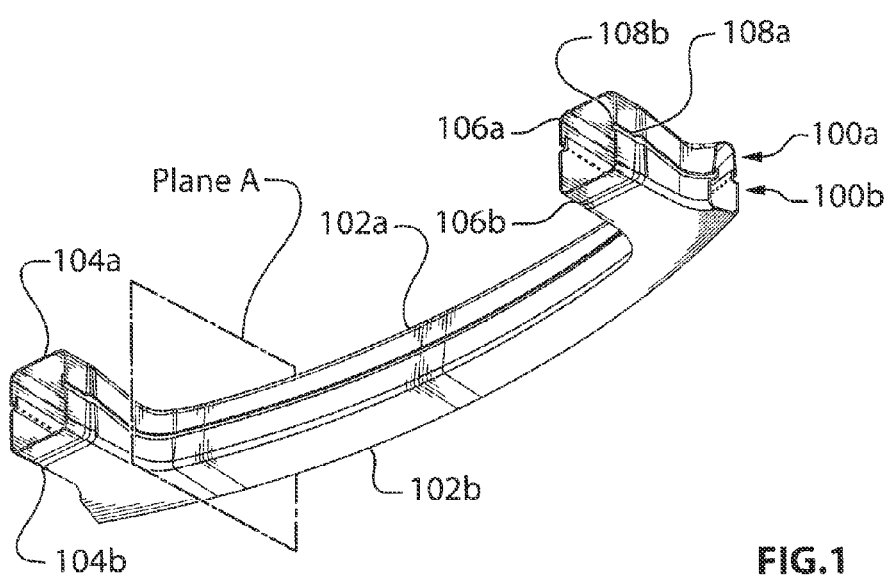
FIG. 1 is a rear perspective view of a crash management system according to a first embodiment of the instant invention.

Referring to FIG. 1, shown is a rear perspective view of a crash management system according to a first embodiment of the instant invention. The crash management system comprises a first shell 100a and a second shell 100b. The first shell 100a is formed from a first sheet metal blank and the second shell 100b is formed separately from a second sheet metal blank. By way of a specific and non-limiting example, the first and second sheet metal blanks each comprise 22MnB5 boron steel. More particularly, the first shell 100a and the second shell 100b are formed using a tailored tempering hot forming process, as is described in greater detail in the following sections.

The first shell 100a comprises a high tensile strength beam portion 102a. Integrally formed with the beam portion 102a is a first low yield strength crash box portion 104a proximate a first end of the beam portion and a second low yield strength crash box portion 106a proximate a second end of the beam portion, the second end being opposite the first end. Similarly, the second shell 100b comprises a high tensile strength beam portion 102b. Integrally formed with the beam portion 102b is a first low yield strength crash box portion 104b proximate a first end of the beam portion and a second low yield strength crash box portion 106b proximate a second end of the beam portion, the second end being opposite the first end.

A typical value of the tensile strength of the beam portions 102a and 102b is between about 1300 N/mm$^2$ and about 1600 N/mm$^2$. A typical value of the yield strength of the first and second crash box portions 104a/b and 106a/b, respectively, is between about 200 N/mm$^2$ and about 450 N/mm$^2$. The yield strength of the crash box portions is adjustable during the hot forming process, to achieve desired values depending upon performance requirements. Due to the nature of the hot forming process that is used to form the first shell 100a and the second shell 100b, a transition zone exists between the high tensile strength material of the beam portion 102a/b and the low yield strength material of the first and second crash box portions 104a/b and 106a/b.

Figure 2:
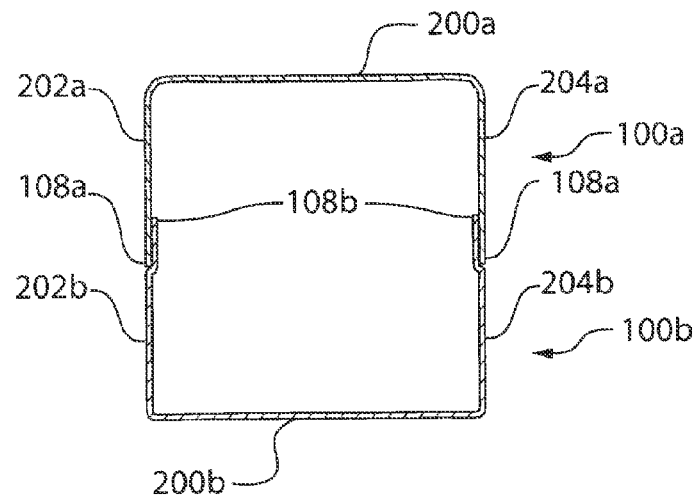
FIG. 2 is an enlarged cross-sectional view taken in the Plane A of FIG. 1.

Referring also to FIG. 2, shown is an enlarged cross-sectional view taken in the Plane A of FIG. 1. The first shell 100a is a unitary component having a generally three-sided channel structure with one open side. A top surface 200a of the first shell 100a extends into two opposite sidewalls 202a and 204b. The edges of the two opposite sidewalls along the open side of the first shell define a first rim 108a. Similarly, the second shell 100b is also a unitary component having a generally three-sided channel structure with one open side. A bottom surface 200b of the second shell 100b extends into two opposite sidewalls 202b and 204b. The edges of the two opposite sidewalls 202b and 204b along the open side of the first shell define a second rim 108b. The second rim 108b is shaped to nest inside the first rim 108a when the first shell 100a is fixedly secured to the second shell 100b. The generally three-sided channel structures extend the length of the beam portions 102a and 102b, and through the first and second crash box portions 104a/b and 106a/b, respectively. Of course, it is to be understood that the terms "top" and "bottom" as used herein are defined in the context of FIG. 2, and that they are not intended to imply any required orientation of the crash management system when in an installed condition.

Optionally, the first and second crash box portions 104a/b and 106a/b are formed with "beads" (not shown) to optimize folding behavior during an impact.

A method of making the crash management system of FIG. 1 includes heating the first blank of flat sheet steel in a furnace to austenitic state, moving the first blank into a cooled pair of shaping tools, and then pressing the hot first blank into the shape of the first shell 100a. The shaped first shell 100a is maintained in the tools until the beam portion 102a has hardened into an essentially martensitic structure with a tensile strength of between about 1300 N/mm$^2$ and about 1600 N/mm$^2$. During the time the first shell 100a is maintained in the tools, a portion of each tool adjacent the first and second crash box portions 104a and 106a, respectively, is maintained at such a temperature that the first and second crash box portions 104a and 106a, respectively, are prevented from rapid cooling and will reach only a yield strength of between about 200 N/mm$^2$ and about 450 N/mm$^2$. By way of a specific and non-limiting example, heat is added (e.g., using cartridge heaters) to the portion of each tool adjacent the first and second crash box portions 104a and 106a, respectively, and/or the portion of each tool adjacent the first and second crash box portions 104a and 106a, respectively, is insulated such that the rate of heat loss from said crash box portions is reduced relative to the rate of heat loss of non-insulated portions.

Similarly, the second blank of flat sheet steel is heated in a furnace to austenitic state, is moved into a cooled pair of shaping tools, and is pressed while still hot first into the shape of the second shell 100b. The shaped second shell 100b is maintained in the tools until the beam portion 102b has hardened into an essentially martensitic structure with a tensile strength of between about 1300 N/mm² and about 1600 N/mm². During the time the second shell 100b is maintained in the tools, a portion of each tool adjacent the first and second crash box portions 104b and 106b, respectively, is maintained at such a temperature that the first and second crash box portions 104b and 106b, respectively, are prevented from rapid cooling and will reach only a yield strength of between about 200 N/mm² and about 450 N/mm². By way of a specific and non-limiting example, heat is added (e.g., using cartridge heaters) to the portion of each tool adjacent the first and second crash box portions 104b and 106b, respectively, and/or the portion of each tool adjacent the first and second crash box portions 104b and 106b, respectively, is insulated such that the rate of heat loss from said crash box portions is reduced relative to the rate of heat loss of non-insulated portions.

The separately formed first shell 100a and second shell 100b are aligned one with the other and then fixedly secured together. Some non-limiting techniques for fixedly securing the first shell 100a to the second shell 100b include: thermal joining (such as for instance spot welding, metal inert gas (MIG) welding, laser welding, etc.); adhesive bonding; and, mechanical coupling (such as for instance clinching or riveting). According to the first embodiment, the second shell 100b is a closing element that is fixedly secured to the first shell 100a.

Figure 3:
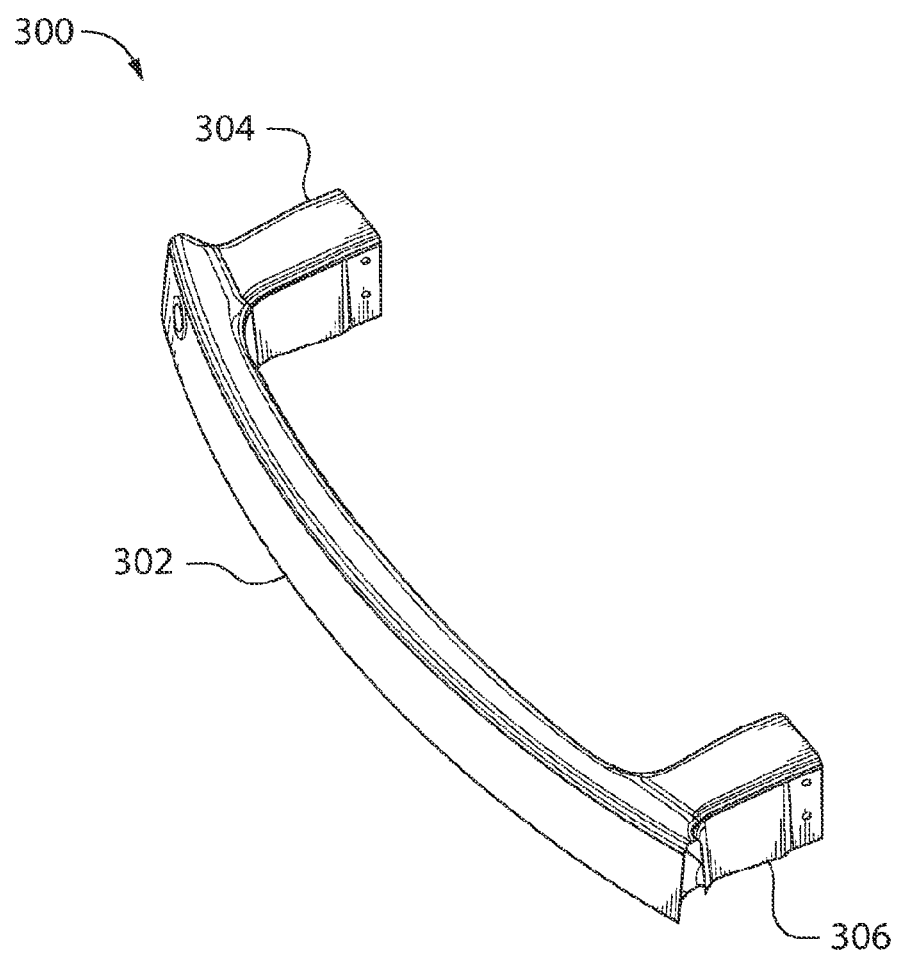
FIG. 3 is a front perspective view of a crash management system according to a second embodiment of the instant invention.

Referring now to FIG. 3, shown is a front perspective view of a crash management system according to a second embodiment of the instant invention. The crash management system comprises a one-piece shell 300 that is formed from a first sheet metal blank, and a not illustrated closing element. By way of a specific and non-limiting example, the first sheet metal blanks comprises 22MnB5 boron steel. More particularly, the one-piece shell 300 is formed using a tailored tempering hot forming process, as is described in greater detail in the following sections.

The one-piece shell 300 comprises a high tensile strength beam portion 302. Integrally formed with the beam portion 302 is a first low yield strength crash box portion 304 proximate a first end of the beam portion and a second low yield strength crash box portion 306 proximate a second end of the beam portion, the second end being opposite the first end. A typical value of the tensile strength of the beam portion 302 is between about 1300 N/mm² and about 1600 N/mm². A typical value of the yield strength of the first and second crash box portions 304 and 306, respectively, is between about 200 N/mm² and about 450 N/mm². The yield strength of the crash box portions is adjustable during the hot forming process, to achieve desired values depending upon performance requirements. Due to the nature of the hot forming process that is used to form the one-piece shell 300, a transition zone exists between the high tensile strength material of the beam portion 300 and the low yield strength material of the first and second crash box portions 304 and 306.

Referring now to FIG. 4a, shown is a rear perspective view of the crash management system of FIG. 3. Also shown in FIG. 4a is the closing element 400. In particular, the closing element 400 is a cold stamped part that has mid-range strength. More particularly, the properties of the closing element are approximately the same as the properties of the crash box portions 304 and 306.

Figure 4:
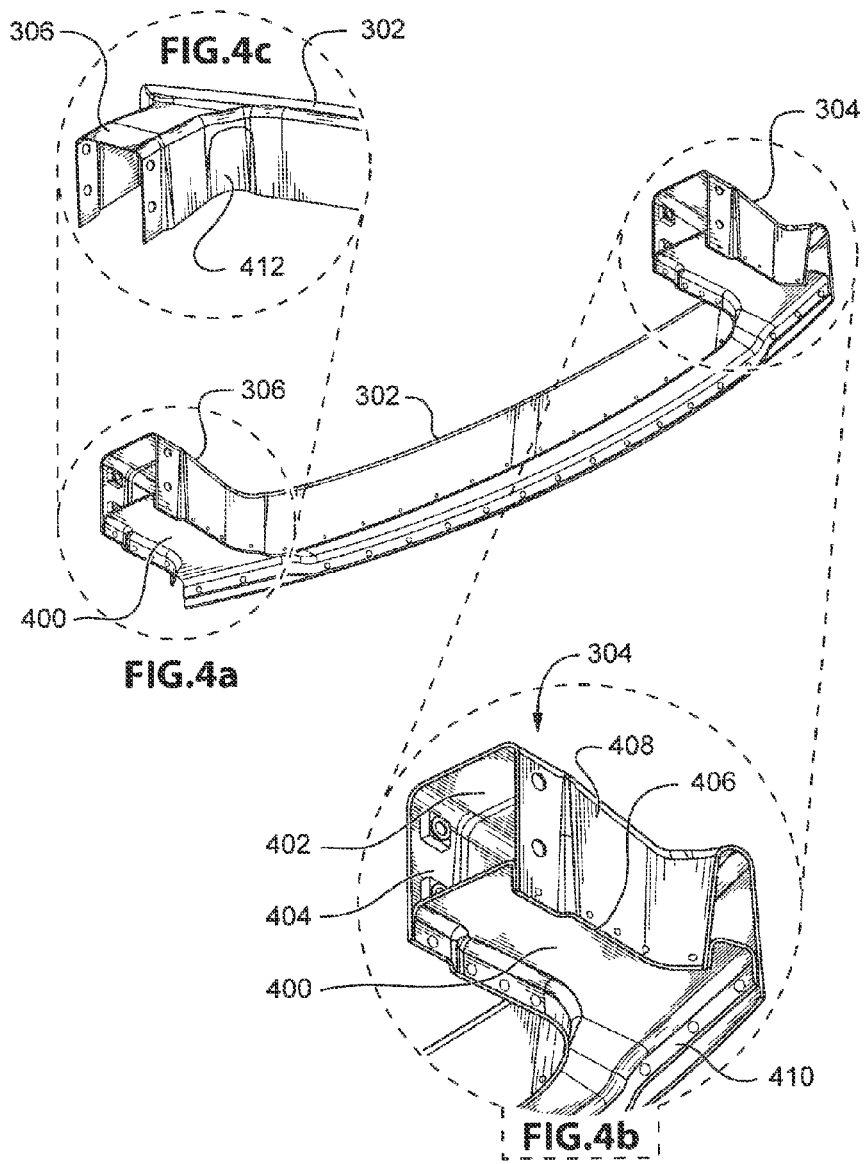
FIG. 4a is a rear perspective view of the crash management system of FIG. 3.
FIG. 4b is an enlarged detail view of a portion of FIG. 4a lying within one of the dashed-line circles.
FIG. 4c is an enlarged detail view of a portion of FIG. 4a lying within the other one of the dashed-line circles.

Referring also to FIG. 4b, shown is an enlarged detail view of the portion of FIG. 4a lying within the dashed-line circle. The one-piece shell 300 is a unitary component having a generally three-sided channel structure with one open side. A top surface 402 of the one-piece shell 300 extends into two opposite sidewalls 404 and 406. The edges of the two opposite sidewalls along the open side of the first shell define a rim 408. The generally three-sided channel structure extends the length of the beam portion 302, and through the first and second crash box portions 304 and 306. Also shown in FIG. 4b, the closing element 400 has a peripheral flange 410 for use in fixedly securing the closing element 400 to the rim 408 of the one-piece shell 300. Of course, it is to be understood that the term "top" as used herein is defined in the context of FIG. 4, and that it is not intended to imply any required orientation of the crash management system when in an installed condition.

Referring also to FIG. 4c, shown is an enlarged detail view of a portion of FIG. 4a lying within the other dashed-line circle. FIG. 4c shows that the corner between the crash boxes and the beam portion may optionally be notched out (notch 412), for formability reasons.

Optionally, the first and second crash box portions 304 and 306 are formed with "beads" (not shown) to optimize folding behavior during an impact.

A method of making the crash management system of FIG. 3 includes heating the first blank of flat sheet steel in a furnace to austenitic state, moving the first blank into a cooled pair of shaping tools, and then pressing the hot first blank into the shape of the one-piece shell 300. The shaped one-piece shell 300 is maintained in the tools until the beam portion 302 has hardened into an essentially martensitic structure with a tensile strength of between about 1300 N/mm² and about 1600 N/mm². During the time the one-piece shell 300 is maintained in the tools, a portion of each tool adjacent the first and second crash box portions 304 and 306, respectively, is maintained at such a temperature that the first and second crash box portions 304 and 306, respectively, are prevented from rapid cooling and will reach only a yield strength of between about 200 N/mm² and about 450 N/mm². By way of a specific and non-limiting example, heat is added (e.g., using cartridge heaters) to the portion of each tool adjacent the first and second crash box portions 304 and 306, respectively, and/or the portion of each tool adjacent the first and second crash box portions 304 and 306, respectively, is insulated such that the rate of heat loss from said crash box portions is reduced relative to the rate of heat loss of non-insulated portions.

Separately, the closing element 400 is cold stamped from a suitable, mid-strength steel stock. The flange 410 of the closing element 400 is then aligned with the rim 408 along the open side of the one-piece shell 300, and the closing element 400 is fixedly secured to the one-piece shell 300. Some non-limiting techniques for fixedly securing the one-piece shell 300 to the closing element include: thermal joining (such as for instance spot welding, metal inert gas (MIG) welding, laser welding, etc.); adhesive bonding; and, mechanical coupling (such as for instance clinching or riveting).

Figure 5:
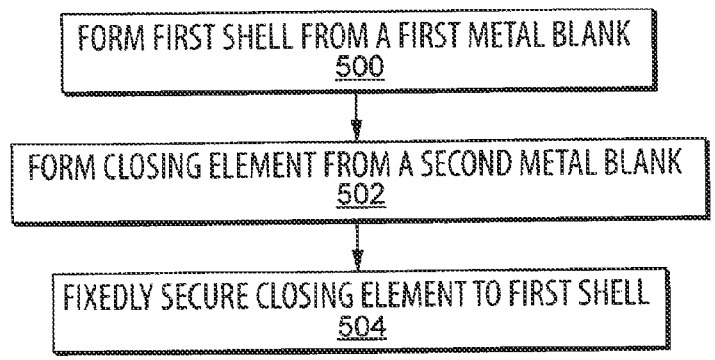
FIG. 5 is a simplified flow diagram of a method according to an embodiment of the instant invention; and, FIG. 6 is a simplified flow diagram of a method according to an embodiment of the instant invention.

Referring to FIG. 5, shown is a simplified flow diagram of a method according to an embodiment of the instant invention. At 500 a first shell is formed from a first sheet metal blank by a hot forming process, the first shell having a high tensile strength beam portion and integrally formed therewith a first low yield strength crash box portion proximate a first end of the beam portion and a second low yield strength crash box portion proximate a second end of the beam portion, the first shell having an open face extending continuously along the beam portion and each of the first and second crash box portions. At 502 a closing element is formed from a second sheet metal blank. At 504 the closing element is fixedly secured adjacent to the open face of the first shell.

Figure 6:
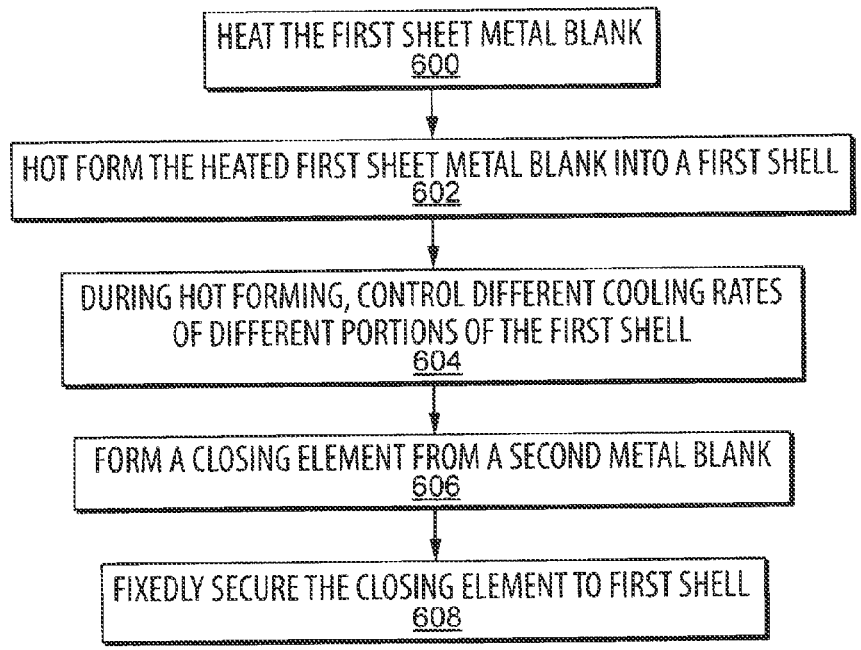

Referring to FIG. 6, shown is a simplified flow diagram of a method according to an embodiment of the instant invention. At 600 a first sheet metal blank is heated to at least an austenitizing temperature of the metal. At 602 the austenitic blank is hot formed in a pair of cooled tools to form a first one-piece beam-box component having a generally three-sided channel structure with one open side. At 604, during the hot forming process, a beam portion of the formed component is cooled at a first rate that is sufficiently rapid to harden the beam portion into an essentially martensitic structure with a tensile strength of between about 1300 N/mm$^2$ and about 1600 N/mm$^2$, and crash box portions of the formed component are cooled at a second rate that is slower than the first rate, such that the crash box portions achieve a yield strength of between approximately 200 N/mm$^2$ and 450 N/mm$^2$. At 606 a closing element is formed from a second sheet metal blank. At 608 the closing element is fixedly secured along the open side of the first one-piece beam-box component.

The descriptions of the crash management systems according to the various embodiments of the instant invention have omitted any mention of routine mounting structures, such as through-holes etc., which are used for securing said crash management system to the longitudinal members of a vehicle chassis, or for securing a cushioning element or bumper cover to said crash management system. Nevertheless, a person having ordinary skill in the art will understand the requirements for such mounting structures, based on the various views that are presented in the appended drawings.

In addition, the method of imparting tailored strength properties to the final components has been described only in terms of one specific and non-limiting method, in which a blank is heated uniformly to austenitic state and selected portions are cooled at a rate during forming, which results in lower strength in said selected portions relative to other portions. Optionally, only some portions of the blank are heated initially to austenitic state, and selected portions are either shielded from heating or kept in a lower temperature environment (e.g., external to a furnace or within a cooler furnace portion) such that the austenitizing temperature of the material in said selected portions is not exceeded. Further optionally, the blank is formed and selected portions are heated subsequently (e.g., by inductive heating) to austenitic state and then rapidly cooled to achieve high strength in said selected portions. Still further optionally, the entire component is formed with rapid cooling, and subsequently selected portions are heated to a temperature that is sufficiently high to induce a phase change in said selected portions, followed by controlled cooling at a rate that results in a softening of the material in said selected portions relative to the non-heated portions.

Depending on performance requirements, yield strengths of the first and second crash box portions may be outside of the range of approximately 200 N/mm$^2$ and 450 N/mm$^2$. This range currently is understood to provide acceptable performance, but should not be regarded as a strict requirement for achieving acceptable performance of the beam-box crash management component.

Numerous other embodiments may be envisaged without departing from the scope of the instant invention.

What is claimed is:

1. A method of making a beam-box crash management system, comprising:
    forming a first shell from a first sheet metal blank by a hot forming process, the first shell having a high tensile strength beam portion and integrally formed therewith a first low yield strength crash box portion proximate a first end of the beam portion and a second low yield strength crash box portion proximate a second end of the beam portion, the first shell having an open face extending continuously along the beam portion and each of the first and second crash box portions;
    forming a closing element from a second sheet metal blank by a cold stamping process; and
    fixedly securing the closing element adjacent to the open face of the first shell to enclose the beam portion and each of the first and second crash box portions of the first shell.

2. A method according to claim 1, wherein the tensile strength of the beam portion is between approximately 1300 N/mm$^2$ and approximately 1600 N/mm$^2$.

3. A method according to claim 1, wherein the yield strength of the first and second crash box portions is between approximately 200 N/mm$^2$ and 450 N/mm$^2$.

4. A method according to claim 1, wherein the yield strength of the closing element is approximately the same as the yield strength of the first and second crash box portions.

5. A method according to claim 1, wherein fixedly securing the closing element adjacent to the open face of the first shell comprises one of thermally joining, adhesively bonding and mechanically coupling the closing element to the first shell.

\* \* \* \* \*